United States Patent [19]
Reece et al.

[11] Patent Number: 5,915,214
[45] Date of Patent: Jun. 22, 1999

[54] MOBILE COMMUNICATION SERVICE PROVIDER SELECTION SYSTEM

[76] Inventors: Richard W. Reece; Matthew L. Reece, both of 1727 R St, N.W.,#302, Washington, D.C. 20009

[21] Appl. No.: 08/393,422

[22] Filed: Feb. 23, 1995

[51] Int. Cl.⁶ .................................................. H04Q 7/20
[52] U.S. Cl. ........................ 455/406; 455/407; 455/432; 455/552; 379/115; 379/144
[58] Field of Search ..................... 379/112, 114, 379/115, 144, 58, 59, 60; 455/33.1, 33.2, 34.1, 406–408, 422, 432, 434, 436, 552

[56] References Cited

U.S. PATENT DOCUMENTS

| | | | |
|---|---|---|---|
| 4,751,728 | 6/1988 | Treat | 379/114 X |
| 5,159,625 | 10/1992 | Zicker | 455/432 |
| 5,303,297 | 4/1994 | Hillis | 455/406 |
| 5,400,395 | 3/1995 | Berenato | 379/114 |
| 5,442,806 | 8/1995 | Barber et al. | 455/432 X |
| 5,463,675 | 10/1995 | Gerszberg | 455/432 X |
| 5,577,100 | 11/1996 | Mc Gregor et al. | 379/58 |
| 5,586,338 | 12/1996 | Lynch et al. | 455/34.1 |
| 5,590,156 | 12/1996 | Carney | 455/34.1 X |
| 5,613,213 | 3/1997 | Naddell et al. | 455/34.1 X |

FOREIGN PATENT DOCUMENTS 3-132294  10/1989  Japan ........................................ 379/58

*Primary Examiner*—Dwayne D. Bost
*Assistant Examiner*—Nay Maung
*Attorney, Agent, or Firm*—Rothwell, Figg, Ernst & Kurz

[57] ABSTRACT

A system and method for enabling a user of wireless communication services such as mobile cellular telephone services to easily switch among various available service providers based on real time cost and service feature information. A central processing facility serves as an intermediary between mobile communication users and service providers and broadcasts real time service provider information over an established information channel, in each region served by wireless communication carriers. Users are able to select an optimal service provider based on the received service provider information. In this way, competition among wireless carriers is enhanced.

20 Claims, 10 Drawing Sheets

MOBILE COMMUNICATION SERVICE PROVIDER SELECTION SYSTEM

BACKGROUND OF THE INVENTION

1. Field of the Invention

This invention relates generally to wireless communication service systems such as mobile cellular subscriber services, and more particularly to a system and method for enabling a user of such services to easily switch among various available service providers based on real time cost and service feature information.

2. Background and Prior Art

Conventional wireless communications services suffer from several technical and structural limitations which inhibit competition and reduce user flexibility, thus raising prices and restricting usefulness. The most common of such services is cellular radiotelephone subscriber services, however this invention is equally applicable to all equivalent wireless communication subscriber services such as mobile data unit communication services and wireless modem portable computer communication services.

Competition exists in two-way wireless communication services primarily because the Federal Communications Commission has established guidelines to promote at least two service providers in each geographical region. But the technology of the conventional system allows service providers to "capture" customers and charge excessively high rates. More intense competition in the wireless communication market would drive down prices in the same way that competition in the land-wired long distance market has reduced prices significantly, and thus would benefit consumers.

Under the existing system wireless communication service providers only face true competition when attracting new subscribers. Once a consumer has subscribed to a particular service provider, it is difficult to switch providers so competition is limited and the consumer is subject to the pricing considerations of a near monopoly. Two primary factors which inhibit the switching capability of consumers are the present technological limitations of individual mobile communications devices and the lack of complete and understandable information on service rates.

Under the existing system, switching between service provider requires that cellular radiotelephones be reprogrammed at a designated location with specialized equipment or by individuals with specialized knowledge. Most consumers do not have extensive familiarity or knowledge of the internal operations of cellular telephones and thus are discouraged from attempting reprogramming, even where individual mobile devices may possess such a capability. In order to switch to a different service provider, the consumer thus had to transport his or her cellular phone to a specific location for special programming by dedicated equipment or support personnel and pay a service charge. Such hidden costs and extensive efforts have dissuaded consumers from switching to another carrier, thus reducing competition and raising prices.

This problem is even more acute in roaming situations (i.e., when the mobile communication device is moved outside the coverage area of the "home" system). Without switching capability, the consumer is locked by technology into utilizing one particular service provider. This is essentially monopoly capture. Since the provider of the roaming communications service does not have to be concerned with competition, roaming service charges are often several times higher than home system rates. The only option left for the user to avoid these high rates is not to use the service—to switch off the device.

But even if switchable mobile communication devices existed in the prior art, the lack of information on service rates would still inhibit flexible consumer switching. The problem is that consumers simply cannot keep up with constantly changing subscriber systems and prices. True rates are usually not known by the consumer because service providers often combine subscription fees, per-minute charges, and special promotions to entice consumers to subscribe to their networks. There is little incentive for providers to clarify their rate structure because of the difficulty associated with a subscriber attempting to switch to another provider. Consumers are at an even greater disadvantage while roaming. It is a formidable task for individual consumers to acquire and process all the different rates in areas where they may be traveling.

One further problem with the prior art of wireless communication services is that prices are inflexible and cannot be altered to reflect actual real time demand. This problem is especially acute in the current cellular telephone industry. For example, the current cellular industry generally charges two separate rates: a higher rate for predetermined peak periods and a lower rate for predetermined off-peak periods. This system is inadequate for both wireless service providers and users. In areas and times of high volume usage, cellular subscribers may be unable to place a call because demand outstrips the limited capacity of the system. High paying subscribers—those who have purchased large "inventories" of call minutes—or those making important phone calls face the same probability of acquiring an open channel as infrequent users or individuals making less important calls. This is highly inconvenient and expensive—users are paying for inventories they can't use. This current system also hinders the economic efficiency of the wireless service providers. When demand exceeds capacity, revenue is being lost because there are users willing to pay a higher rate in order to be assured of acquiring a channel; in this instance raising prices would have the effect of substituting the users willing to pay the higher rate for those users who are not willing to pay. And when capacity significantly exceeds demand, assets are depreciating but not are not generating revenue. Reducing prices to stimulate demand would allow these assets to generate revenue when otherwise they would not.

Several systems have been disclosed that seek to remedy some of problems outlined above. U.S. Pat. No. 5,159,625 discloses a method where a remotely programmable cellular radiotelephone is configured to select particular cellular service providers while roaming. The cellular phones undergo periodic reprogramming over the air by a base computer system. The programming dictates to the phone which roaming systems may or may not be used by the individual phones while roaming. This system requires that the decisions for broad classes and types of devices be made by a central processor. This central decision making is flawed in that all consumers are lumped into one group, irrespective of their individual communications patterns and needs. This sharply reduces consumer flexibility and limits the potential benefits of competition. Secondly, this method does not inform the consumer of the parameters involved in the process: other factors besides price and services may enter into the decision of which service provider to use. The consumer is completely unaware of the hidden costs and contracts that may affect the programming of their individual devices, thus also limiting true competition. Thirdly, this method does not address the situation in which rates change between reprogramming intervals, thus rendering the programmed parameters no longer accurate.

U.S. Pat. No. 5,357,561 discloses limited centralized control or programming of wireless devices through paging techniques. Programming by paging methods requires added capacity and overhead, yet cannot offer the consumer the level of information and flexibility necessary to introduce true competition and selection capability.

U.S. Pat. No. 5,303,297 discloses a dynamic pricing method for wireless communication in which price structure is varied in real time according to the load (i.e., number of simultaneous users) on the system. The number of the destination dialed by the user is transmitted to the service provider, where the system computes the calling rate based on the location of the caller, the location of the destination station, and the current system load. The system transmits the computed rate information to the user's device where it is displayed. The user may then accept the rate and complete the call or decline to accept the rate in which case the call is dropped. This method does not allow a user to select a different, lower cost provider to complete the call.

SUMMARY OF THE INVENTION

The present invention overcomes the problems and inadequacies of the conventional wireless communication services systems by providing wireless mobile communications devices with the capability to utilize a set of user-defined parameters to instantly select and switch to an optimal wireless service provider and conduct two-way communications in the standards used by the selected service provider.

The present invention further provides a system and method whereby accurate, complete and instant information on the services provided and the rates charged by local wireless service providers may be supplied to the aforementioned mobile communications devices via a one-way wireless transmission system. The mobile device may then either automatically or in response to direct user input, select an optimal service provider based on the received information. Use of a one-way transmission system provides the advantage that an unlimited number of users may access the information simultaneously without encountering the capacity problems that plague two-way wireless communications.

According to one embodiment of the present invention, mobile communication devices use programmable digital components (also known as Digital Signal Processing or DSP). The software to implement the different digital standards used by different service providers may be stored in on-board memory or delivered via the aforementioned one-way information transmission, thus allowing the user access to a wide variety of service providers. By using software delivered to the mobile communication device via the aforementioned one-way information transmission, different service providers may use their own different digital standards, thus eliminating the need to implement new industry-wide standards. Additionally, capacity may be increased through software, reducing costs still further.

According to another aspect of the present invention, a central processing and switching facility is provided that serves as an information depot and intermediary or interface between users and service providers to allow seamless communications transfers between different providers and to provide simplified billing even as the user switches between a plurality of service providers.

As an information depot, the central processing and switching facility tracks the location and service provider selection of every mobile communications device using the system so that incoming calls to mobile devices may be routed to users at all times. Thus a user may switch between a plurality of service providers without losing the capability of receiving incoming calls.

As a service provider/user intermediary, the central processing facility may serve as a payment and billing agent between users and service providers, thus allowing service to be provided to the user without requiring individual contract agreements between every user and every service provider.

The present invention provides a system for providing selectable wireless communication service to users of mobile communication devices, comprising a central processing facility for collecting and processing information on at least two available wireless communication service providers in particular geographical regions, and transmitting devices for transmitting wireless service provider information processed by the central processing facility to mobile communication devices, wherein users of the mobile communication devices are able to select a wireless communication service provider from among the at least two available service providers based on information received from the information transmitting device.

According to another aspect, the present invention provides a method for enabling a user of wireless communication services to switch among various available service providers, comprising the steps of transmitting to a user's mobile communication device real time cost and service feature information for a plurality of available service providers for a region in which the user is currently located, thereby allowing the user to select a service provider to provide communication services to the user based on the transmitted information, transmitting user status and identification information on specific users to service providers in response to requests transmitted by the service providers, determining if users identified in the requests are presently engaged in a two-way wireless communication, instructing a requesting service provider to allocate a communication channel for a specific user determined to be presently engaged in a two-way wireless communication, and transferring the two-way wireless communication to the requesting service provider and disconnecting the two-way wireless communication from a previous service provider in response to a ready signal received from the requesting service provider.

BRIEF DESCRIPTION OF THE DRAWINGS

The present invention will become more fully understood from the detailed description given hereinbelow and the accompanying drawings, which are given by way of illustration only and are not limitative of the present invention, and wherein.

DETAILED DESCRIPTION OF THE PREFERRED EMBODIMENTS

Figure 1:
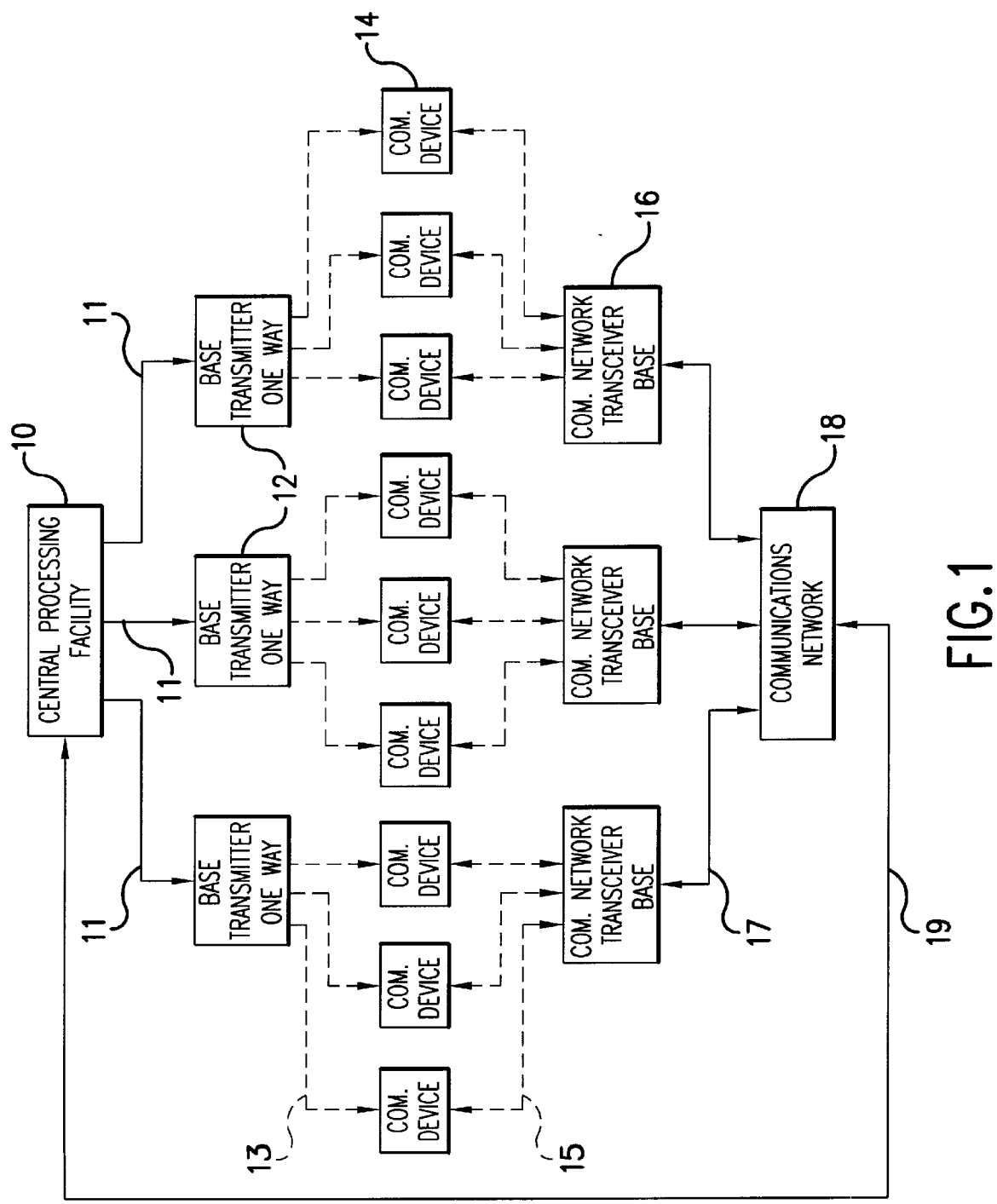
FIG. 1 is a block diagram of one preferred embodiment of a one-way information transmission system according to the present invention and its connection to existing two-way wireless communications systems.

Referring now to FIG. 1, according to one preferred embodiment of the invention, a Central Processing Facility (CPF) 10 is provides which includes data processing equipment, telephone switching equipment, and microwave communications equipment. The CPF 10 serves as an information depot and switching facility so that incoming calls to individual mobile devices on the system may be switched through to those devices, regardless of the particular wireless service providers being used by those devices. The CPF 10 also provides billing and payment services to facilitate the flexible switching between wireless communication service providers without the necessity of executing individual contracts for service (most agreements lasting just a few minutes) between a plurality of users and wireless service providers.

The CPF 10 also analyzes, records, and formats the service provider information intended for one-way broadcast before relaying it to base station transmitters 12. Using the CPF 10 for this purpose allows the information to be consolidated and broadcast on one channel using one standard format, thereby simplifying and improving the operation of the mobile communications devices. It will be recognized that the CPF 10 may also be composed of a multitude of smaller distributed facilities forming a network instead of a single central facility.

The CPF 10 is connected to one-way base station transmitters 12 either by wireless microwave transmission, dedicated land wires, the public switched telephone network (PSTN) or some other form of telecommunication common in the art. The chosen connecting medium is represented by reference numeral 11 in FIG. 1.

According to the preferred embodiment, a network of base station transmitters 12 transmits continuous service provider information loops on a limited number of channels in a predetermined frequency band of the electromagnetic spectrum. The base stations 12 are relatively simple broadcast transmitters, with no receiving capability. Transmitters 12 are arranged so that their broadcast coverage area generally correlates with service zones or regions used by the wireless service providers.

If rates differ from location to location within the service region of an individual cellular service provider, the base transmitters 12 and the information being broadcast must correlate with those geographic sub-regions. Placement of the base transmitters 12 may also depend on the frequency of the broadcast, as is well-known in the art.

The effect of the present invention is such that even if a mobile communication device temporarily is unable to receive the information loop signal, a service provider may be chosen at random while still enjoying the benefits of competition in the industry. For example, if a significant percentage of consumers within the service region receive accurate information on the service providers in that region, competition for market share will force the service providers to provide competitive and similar rates. A random selection by the user thus may not carry any significant price penalty. So in the event the individual mobile device does not receive the information, a random selection of a service provider will allow the user to receive service with a reasonable certainty that the rate is competitive.

Individual mobile communication devices 14 receive and demodulate the one-way broadcasts 13 of the base transmitters 12 for analysis of the received data. In a preferred embodiment, at a minimum the data will contain information on the per minute rate that each wireless service provider in the range of the broadcast station is charging. Additionally, the data may also contain:

Codes and channel frequencies of other information channels in the region;

Identification of control channel frequencies of service providers;

Digital codes to implement different digital communications standards.

Each mobile communication device 14 analyzes the received information and selects a service provider based on user-defined parameters. The device may be programmed to perform these decisions automatically or with the intervention of the user. In the preferred embodiment, the most common criterion for the user will be the cost of the wireless service. The rates will be displayed as a simple per minute charge, and the user will likely select the lowest-cost service provider.

Upon selection of a service provider, the mobile device 14 scans the appropriate frequency bandwidth for a control channel that will provide communication with a communications network base station transceiver 16 for registration and conventional two-way communications operations. If the information loop contains the frequency setting of the selected service provider's control channel(s), the device may not need to scan through the bandwidth but may tune directly to the indicated frequency.

In FIG. 1, the base station transceivers 16 and wireless network control facility 18 of only one service provider are shown, but in any given geographic region, there may be a plurality of service providers. For example, in cellular telephone systems, there are normally two service providers per geographic region, known in the art as A and B service providers. Thus there would be one set of communications network base transceivers 16 and central control facility 18 for service provider A and one set for service provider B.

As is common in the prior art, each individual two-way service system may have connections with its own central control facility 18 that coordinates all the individual base stations 16 and may provide connections to the PSTN or other forms of telecommunication common in the art. Each service provider's control facility 18 may in turn establish communications (wireless, land wired, PSTN or other) with the CPF 10 via communication path 19 to acquire additional information on the individual mobile communication device 14 that has requested connection with that provider. The CPF 10 thus is able to record the location of the individual mobile communication device based on the identity of the service provider requesting additional information on that mobile communication device. The connections between the CPF 10 and individual service providers also may be continuous or periodic in addition to being triggered by a request for service from a mobile communication device 14.

In the preferred embodiment, each service provider's control facility 18 may also establish a connection with the CPF 10 in order to provide rates for different sub-regions within its system. The local wireless service providers may continuously monitor the usage of their systems and adjust rates accordingly in order to ensure a balance between supply and demand. The CPF 10 may record the rates for future cross-checking purposes, format the information for compatibility with mobile devices, and pass it on to the appropriate one-way transmitters for broadcasting.

Figure 2:
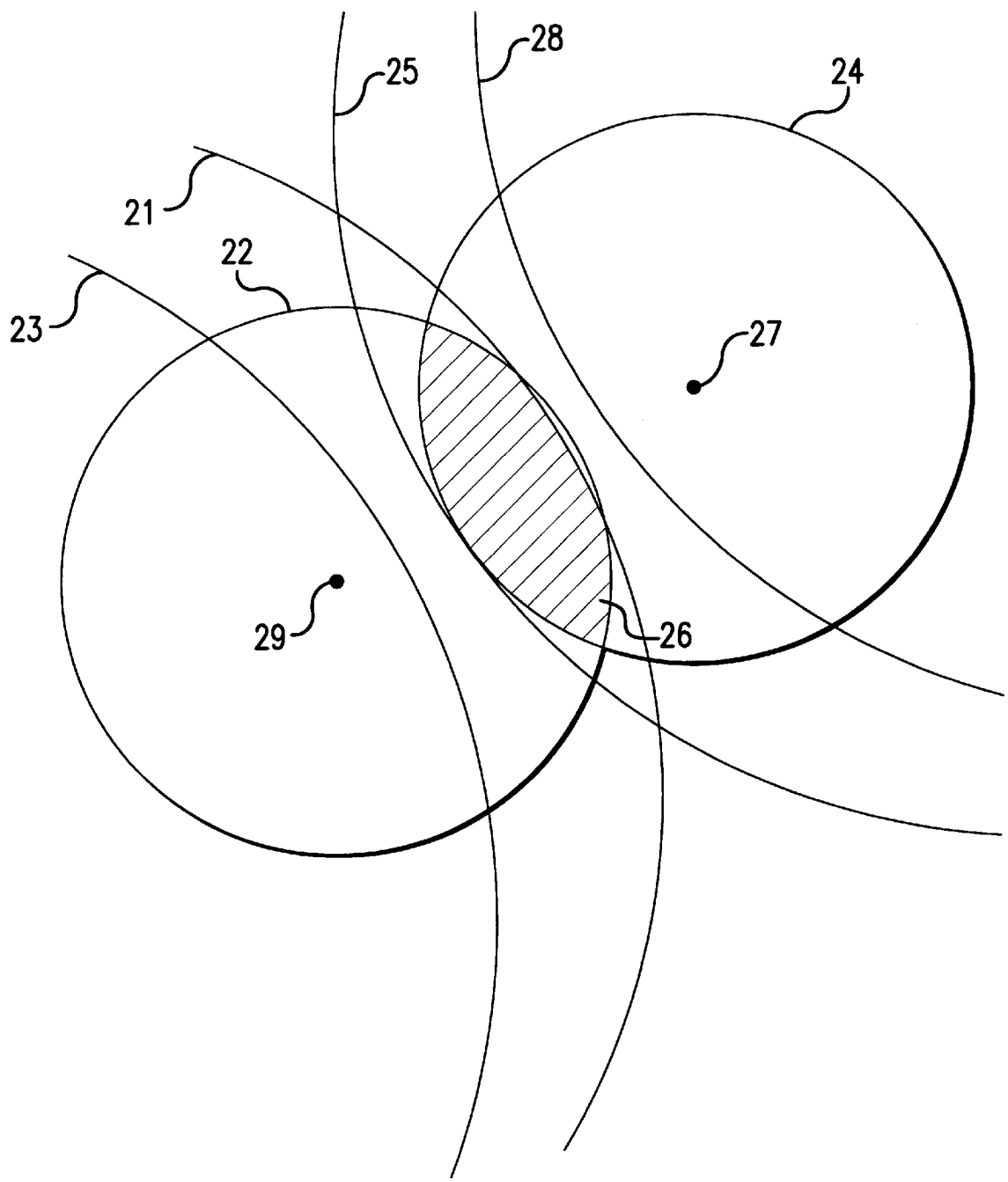
FIG. 2 is a diagram of overlapping areas of separate regions each served by one-way broadcast transmitters according to the present invention.

FIG. 2 is a diagram indicating how one-way base transmitters 12 may overlap in regions where wireless service providers' coverage areas border one another. The diagram also indicates how neighboring sub-regions with different rates may also have overlapping broadcast coverage. The coverage regions of the one-way transmitters must correlate with the sub-regions of the wireless service providers so that users will always receive accurate information on the region (or cell) they are currently within.

Different wireless service providers may have coverage territories represented by areas 21 and 25, with an overlapping region 26. One-way transmitters placed deeper within a region may have ranges that extend out to limits such as 23 and 28. These more powerful transmissions will not overlap. Nearer to the border regions with other service providers, a plurality of smaller one-way transmitters, such as 27 and 29, may be used. Transmitters 27 and 29 may have coverage areas that overlap in region 26. As will be explained below, the signals from transmitters 27 and 29 may be either time-division multiplexed or code-division multiplexed so that the identity of the transmitter sending particular data can be recognized by the mobile communication devices.

Figure 3:
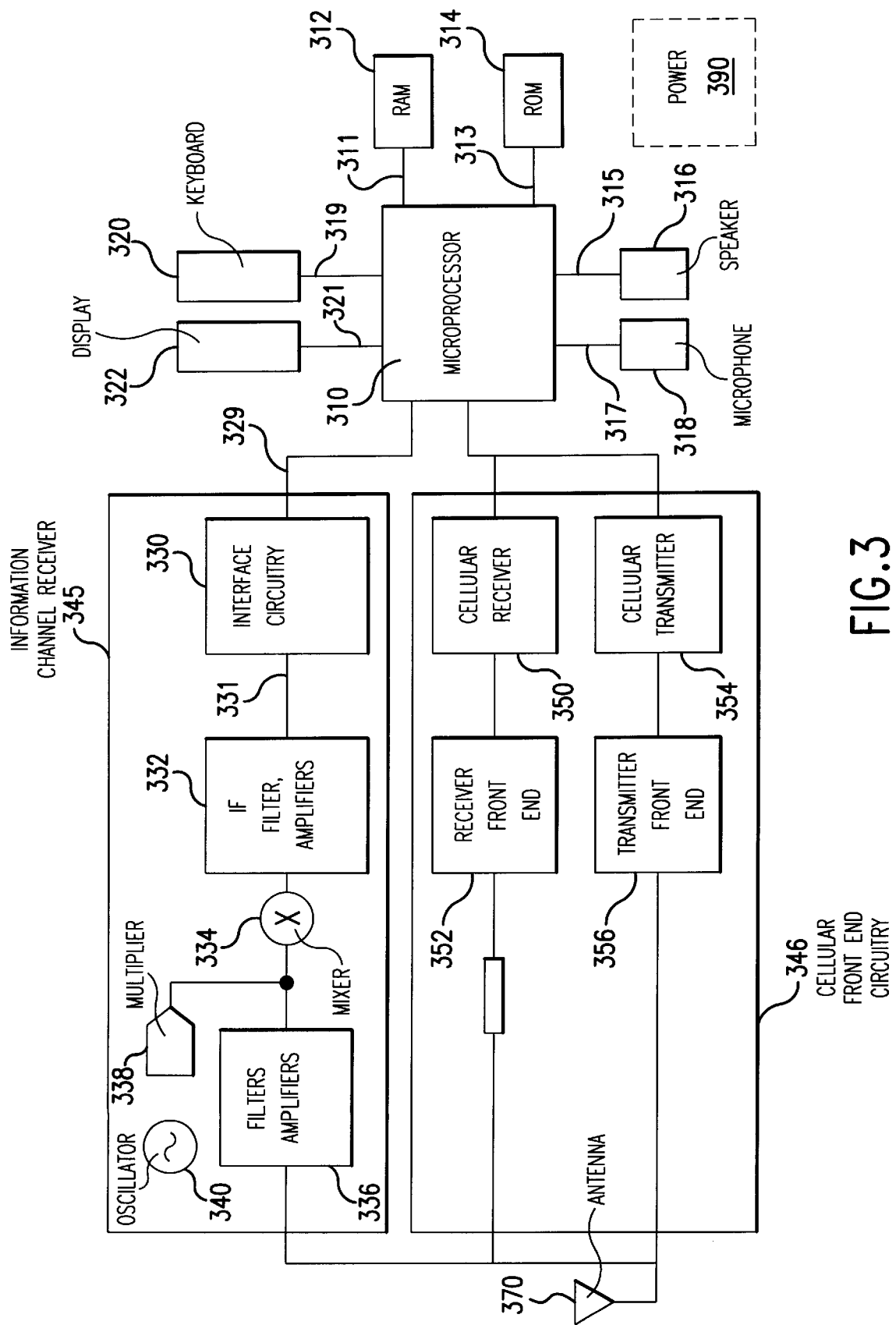
FIG. 3 is a block diagram of one preferred embodiment of a mobile communication device according to the present invention that includes separate receiving circuitry for the one-way information channel.

FIG. 3 illustrates one preferred embodiment of a mobile communication device for use in the present invention wherein a separate information channel receiver 345 is used for the reception of the data broadcast on the dedicated one-way information channel by the base transmitters 12. However, it is contemplated that the one-way information channel(s) controlled by CPF 10 may be set at a frequency or frequencies that are accessible by the receiver circuitry designed for two-way communications, and in this case there would be no need for the separate information channel receiver 345.

The one-way information channel receiver 345 includes conventionally known filter and amplifier circuitry 336, a mixer 334 using the frequency generated by oscillator 340 and multiplier 338, intermediate frequency (IF) filter and amplifier components 332, and interface circuitry 330 which converts IF signals 331 into digital information 329 which is transferred to a microprocessor 310. Microprocessor 310 is used for both one-way and two-way communications functions, thereby keeping the cost and size of the mobile communication device within desirable limits. As mentioned above, component redundancy may be reduced further by tuning the two-way transceiver circuitry 346 to receive the one-way information channel of the present invention.

The one-way information channel signal is received by antenna 370 and appropriately filtered and amplified by circuit 336. A reference frequency signal is generated by oscillator 340 and multiplied by frequency multiplier 338 to achieve the necessary frequency to down convert or demodulate the received information channel signal to an intermediate frequency in mixer 334. The IF signal produced by mixer 334 passes through IF filter and amplifier circuit 332 where it is converted to a baseband signal on line 331. Signal 331 is inputted into interface circuitry 330 where it is converted into digital symbols by an analog-to-digital conversion circuit in interface 330.

Microprocessor 310 receives the digital data on line 329 and uses software instructions and data stored in RAM 312 and ROM 314 to process the data received from interface 330. The data may be displayed on display 322. The user may control the operation of the mobile device by reading the displayed data and entering appropriate commands through keypad 320. The software stored in the mobile device's non-volatile memory may also contain the data necessary to perform basic switches between service providers. For example, ROM 314 may contain the software necessary to access either the "A" or "B" carrier of the present cellular region. The data from the one-way information channel may provide the carriers' control channel information as well as rate information.

The two-way wireless front end circuitry 346 includes receiver filter and amplifier circuitry 352 and demodulator circuitry 350, and transmitter filter and amplifier circuitry 356 and modulator circuitry 354 required to receive and transmit radio communication signals over the electromagnetic spectrum, as is well understood in the art.

Figure 4:
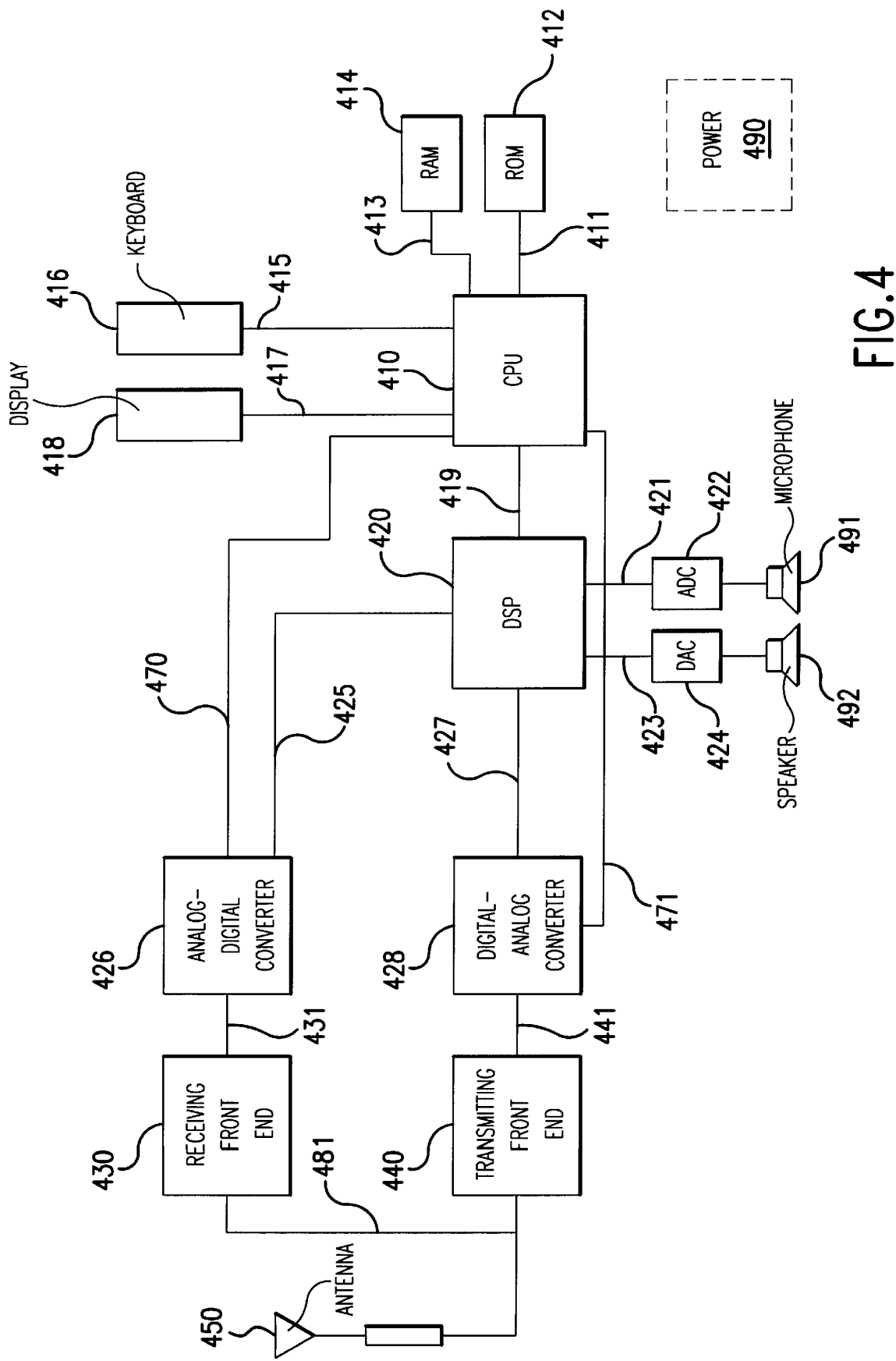
FIG. 4 is a block diagram of another preferred embodiment of a mobile communication device according to the present invention that includes programmable digital processing circuitry.

FIG. 4 is a block diagram of an alternate embodiment of a mobile communication device in which the device is readily programmable through the use of DSP circuitry. Such a mobile communication device may operate within the service provider information broadcast system of the present invention, and also possess the expanded capability of receiving digital standards programming from the information channel. For example, the information channel may provide the software necessary to implement a TDMA (Time Division Multiple Access) standard or a CDMA (Code Division Multiple Access) standard depending on which service provider the user has selected.

The mobile communication device of FIG. 4 includes a central processing unit (CPU) 410, a digital signal processor (DSP) 420, receiver front end circuitry 430 and an analog-to-digital converter 426 for receiving wireless communications, a digital-to-analog converter 428 and transmitter front end circuitry 440 for transmitting wireless communications, an antenna 450, a display 418 (such as an LCD display) and a keypad interface 416; and power source 490. Also included are RAM 414 and ROM 412; a microphone 491 and analog-to-digital converter 422; and a speaker 492 and digital-to-analog converter 424.

The CPU 410 functions as a central controlling processor, and is preferably a microprocessor adapted for a low-power and portable environment. The CPU 410 may connect directly to the LCD display 418 and keypad interface 416 through connections 417 and 415 to on-chip screen drivers and to the A/D and D/A conversion circuitry through connections 470 and 471 to on-chip interface controllers. In an alternate embodiment (not shown) a CPU that does not contain on-chip LCD drivers may be used, thus necessitating separate display driver circuitry. In another embodiment, the display screen and keypad may be integrated through the use of a touch sensitive display screen. The CPU 410 is connected to the DSP 420 through a parallel connection 419, a serial port, or a system bus. The CPU 410 is also connected directly with RAM 414 through connection 413, and with ROM 412 through connection 411. The ROM 412 is sufficient to contain the necessary operating system software, basic communications software (such as the algorithms for a cellular phone standard), personal information software for user convenience, and the software required to tune in and translate the information broadcast by the one-way base transmitter stations 12 (FIG. 1). RAM 414 memory may be static, dynamic, flash, or some combination to allow for an optimal blend of cost and function. The quantity of such memory will correlate with the size of the integrated software programs and algorithms that will be used to drive the functions of the device according to the present invention.

One important advantage of the present invention is that the digital components 430 and 440 of the wireless communications front end may be programmed by software instructions delivered and controlled by the CPU 410. These instructions may stored by digital RF components in an on-chip RAM or a separate local RAM so that the RF components may execute the necessary algorithms without constant attention from the CPU 410. Alternative embodiments (not shown) may require extra interfaces and buffers for I/O functions and clock synchronization depending on the characteristics of individual components.

The DSP 420 is a microprocessor specially adapted to handle the particular rigors of signal processing. This particular embodiment of the present invention utilizes a programmable DSP instead of an application specific (i.e. hardwired) processor so that algorithms may be supplied by the CPU 410 directly or through fast RAM. The DSP used in the preferred embodiment may, like the CPU, incorporate on-chip memory and numerous input/output and communications ports on-chip to reduce power consumption, space, and cost.

The DSP 420 may connect directly with the front-end wireless components for the reception and transmission of communications. The DSP 420 will be capable of performing many, if not all, all of the digital filtering, modulation, coding, compression, and encryption functions necessitated by digital wireless communications. One alternative embodiment of this invention would allocate these digital processing functions to two DSPs, each programmable by the CPU 410.

Reception of a communication signal on the electromagnetic spectrum is performed by the antenna 450 and passed through one or more amplifiers, filters, and mixers 430 until the frequency may be handled by analog-to-digital converters 426. If the DSP 420 is highly integrated and capable, all digital processing functions may be handled by the DSP 420, eliminating the need for separate components 426. The DSP 420 will receive digital data from the RF digital front end components 426 and 430 to be further filtered, modulated, decoded, decompressed, and decrypted by the DSP 420 according to algorithms supplied to the local DSP RAM by the CPU 410. The resulting data is passed to a digital-to-analog converter 424 and the resulting analog audio signal is then sent to a speaker 492. The converter may or may not be integrated into the DSP 420 chip. The DSP 420 may also control volume, either automatically or manually through user input from the keypad or other input switch 416 and CPU 410.

Transmission may work roughly in reverse. The preferred embodiment may use one or more microphones 491 to receive audio input. The analog audio signal will be converted into digital symbols by an analog-to-digital converter 422 (which may also be integrated into the DSP 420). The digital symbols may then be coded, compressed, encrypted and modulated by the DSP 420 with a series of algorithms provided by the CPU 410 to the local DSP RAM. Different cellular providers use different voice coding schemes, so the algorithms must be compatible with the selected service; this task is handled by the CPU 410 and software. After passing through other digital components that may be necessary, the converted analog signal may then modulated in transmitter front end circuit 440 and transmitted through the antenna 450.

In an alternative embodiment, hard-wired communications over the traditional PSTN may be achieved through the use of an integrated RJ-11 jack (not shown) connected to the CPU 410. Software to control the connection can be supplied from ROM 412. This connection may also serve as an input-output port for transferring stored information from the device to a personal computer.

DESCRIPTION OF OPERATION

According to the preferred embodiment, the CPF 10 (FIG. 1) receives and analyzes information concerning the different wireless communication services being offered in a certain geographical region and broadcasts this information through the one-way base transmitters 12 over a dedicated information channel. The information may be provided to the CPF 10 by the wireless service companies or collected through independent research and entered into the processing equipment of the CPF 10. The information is analyzed and converted into a standard format so that different wireless service providers are easily compared. For example, in the preferred embodiment, all costs will be factored into calculated bottom line per minute rates. The CPF 10 converts the information into a simple format for transmission compatible with the mobile devices, as further described below. The CPF 10 may also code, compress, encrypt, and add to the information transmission instructions for the base transmitters, according to various well-known techniques in the art.

The one-way base transmitters 12 then transmit the information in a suitable format, such as data packets in a time division format, preferably using a single channel. The use of time division multiplexing in wireless communications will be familiar to those skilled in the art, but such techniques are used in the invention to simplify the information receiving process and lower costs. Time division techniques allow some overlap between neighboring regions or sub-regions without corrupting the information received by individual mobile devices.

According to the preferred embodiment, one channel may be designated as the primary information channel. Preferably, this channel will be the same across the United States and the world. The frequency of the information channel will be proximate those used by wireless communications service providers. For example, the information channel may be in the 800–1000 MHz range, which covers two-way cellular systems in the United States, Europe, and Asia. Thus individual mobile devices may not need to include the extra components 345 (FIG. 3) to allow the device to receive and demodulate the information frequency.

The primary information channel may also provide information identifying additional secondary information channels. These secondary channels may be used to provide expansion capacity for additional information without crowding the primary channel or forcing the mobile devices to scan for other information channels.

Figure 5:
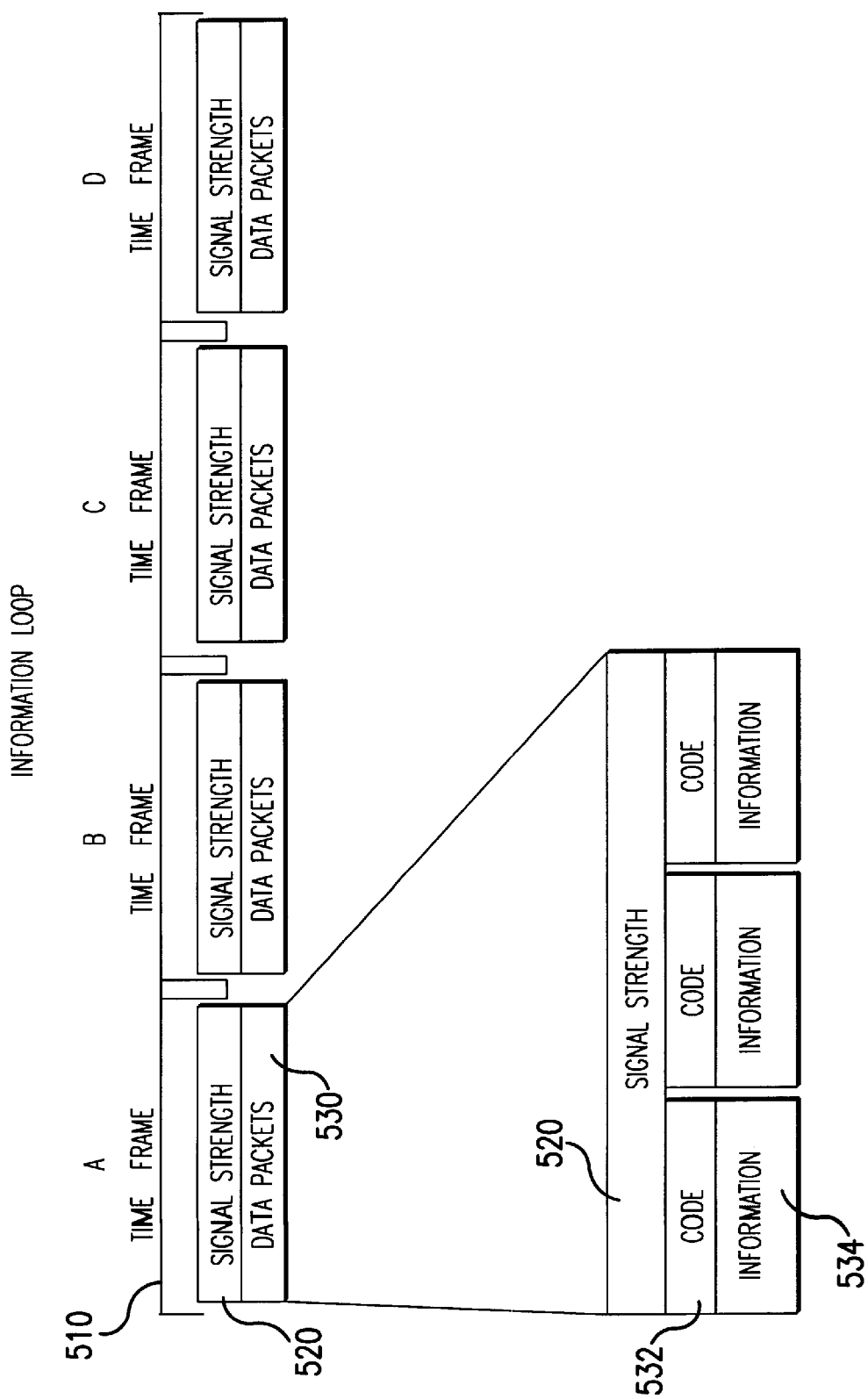
FIG. 5 is a chart diagram representing the structure of one embodiment of a one-way information transmission loop according to the present invention.

FIG. 5 illustrates one example of how the information may be divided into several time frames, and then further identified by signal strength, codes, and the information content. In the preferred embodiment, each information loop may be divided into several time frames 510, as frames A, B, C and D which are continuously repeated in sequence. Different one-way transmitters may be assigned to different time frames. For example, one transmitter may be assigned the time frames corresponding to the A and C frames. A second transmitter may be assigned time frames B and D. The complete information loop is composed of A, B, C, and D; after the second transmitter has broadcast in time frame D, the first transmitter will start the loop again with time frame A.

Each time frame 510 may be subdivided into data packets 530 of varying length. Each packet may be identified by a code 532 and by its signal strength 520. The codes 532 indicate the type of information contained in the data packet. For example, one code may indicate that the accompanying data packet has information on the per minute rate of the "A" cellular service carrier in a geographical region; another code may indicate that its corresponding data packet contains information on the "B" carrier.

When the codes of time frame A and time frame B match, it may indicate that two different transmitters are sending the same types of information, but not necessarily identical data. This situation may occur in an area near the border of two different geographical regions 21 and 25 as shown in FIG. 2. The two data packets may be distinguished by their respective signal strength 520.

In the preferred embodiment, neighboring one-way base transmitters may be synchronized to broadcast data packets in particular time slots. Transmitter 22 in FIG. 2 may transmit in the A and C time slots while its neighbor, transmitter 24, utilizes time slots B and D. Since the signals will arrive at different times, the individual mobile device is able to determine which signal carries the information designated for its current location within a region. Base stations in the center of the service regions 21 and 25 may be quite powerful, and the coverage range of these central one-way transmitters are represented by areas 23 and 28. As long as the signals do not reach into an overlap region 26, these central transmitters may broadcast information in all time frame packets, even time frames assigned to neighboring geographical regions. Because the signal would not reach into the neighboring region, the time frames are not corrupted.

Another variation of the present invention may use code division techniques. Packets of information may be assigned codes according to the nature of the information contained in the packet. Broader bandwidths may be scanned by the mobile device for certain codes and patterns. Overlap regions may support a smooth transition to new coverage regions and sub-regions without losing the vital information necessary for optimal selection of a service provider.

Figure 6:
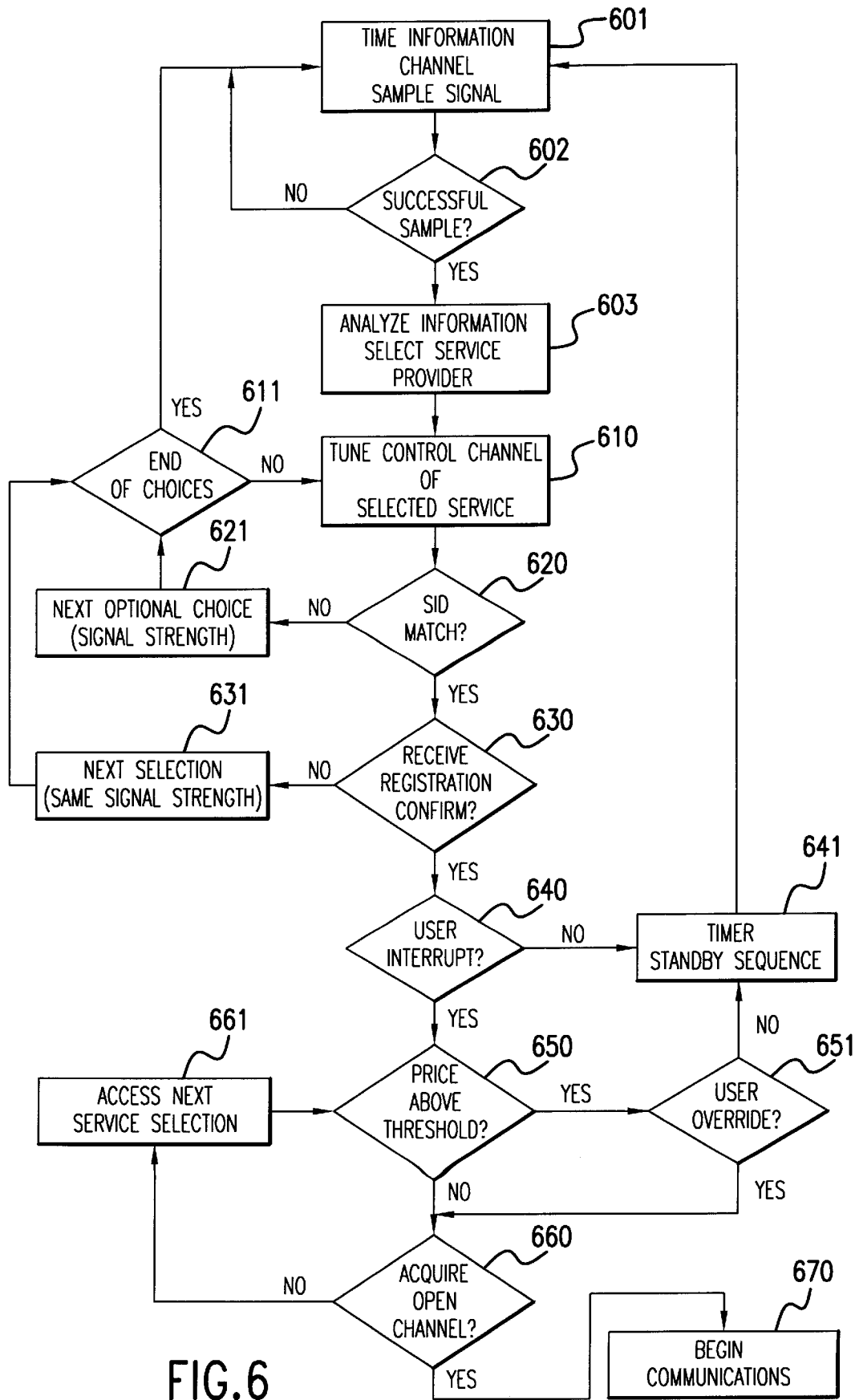
FIG. 6 is a flowchart of the operation of a mobile communication device upon initial power-up within the one-way information system according to one embodiment of the present invention.

In the preferred embodiment, when a mobile device is switched on, it will execute a boot-up procedure and execute software contained in ROM which will tune the device to the frequency channel of the one-way transmitter broadcasting the information loop. FIG. 6 is a flowchart indicating the different steps the mobile device may take to make use of the information channel. After being switched on, the mobile device may tune to the informational channel identified by software 601. The device may sample the signal several times. In step 602, the device will decide whether or not the sample was successful and error free. If unsuccessful, the device will resample the information channel. If an information data stream is not available at this frequency, the device may begin scanning other preprogrammed information channels, or may perform a general scan for an information channel (not shown).

A successful error-free sample of the information channel will cause the device to proceed to step 603 where the data packets will be demodulated, decrypted, and decompressed so that they may be evaluated by the software according to a predetermined algorithm and user-defined parameters. The user, however, may override the automatic function and manually select choices from a series of menus at any time by pressing a designated user interrupt key.

If the time frames contain different information, the device will first analyze the information from the time frame with the strongest signal strength 520. The time frame with the strongest signal may be assumed to represent the regional system where the mobile device is currently located. The optimal service provider may be the one offering the lowest rate per minute (but the user is free to consider other factors such as types of service offerings). The mobile device may assign the available service providers a ranking according to price for possible future use. In the preferred embodiment, the information loop will also contain the frequency range or control channel of each service provider.

After selecting an optimal service provider the mobile device will tune to the control channel at step 610 for identifying information. At step 620, the device may compare the received System Identification number (SID) of the tuned control channel with the SID number of its selected wireless service provider. If the SIDs do not match (which may occur in an overlap region, for example, where the strongest signal is received from a neighboring region), the device will proceed to step 621. Step 621 identifies a second (or third) time frame with a weaker signal strength from the information loop. An optimal service provider from this set will be identified and its control channel tuned in at step 610. The cycle may be repeated so that the device will attempt to connect with the control channel of the optimal service provider of each time frame. Step 611 returns the device to the information channel to step 601 for another sample of the information loop if the device has attempted to tune each optimal provider identified each time frame without success.

When the SID of the selected service provider received from the information loop matches the SID broadcast by the tuned control channel the device will move to step 630, in which the mobile device sends a registration signal to the selected wireless service provider on the control channel and waits for a registration confirmation from the service provider. The wireless service provider may accept or decline to offer service to the mobile device. If service is declined, the mobile device attempts to tune its second choice from the information loop time frame with the strongest signal, at step 631.

In the preferred embodiment, when a mobile device of the present invention is initially activated, it may be assigned a special number that immediately identifies it as a device with switching capability. Special distinguishing codes allow the service companies to differentiate between switchable and non-switchable users.

If the service provider accepts registration at step 630, the mobile device will display the information on the service provider (see FIG. 7) and enter a standby mode awaiting a user interrupt signal at step 640. If there is no user interrupt, the device will hold in the standby mode for a predetermined amount of time (step 641) before returning to step 601 to resample the information channel for an update on services and prices.

Figure 7:
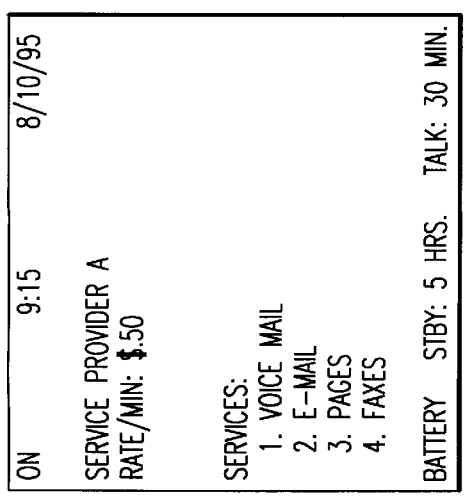

A user interrupt may occur when the user presses the "Send" key to initiate two-way communications. The device will then check the price of the selected service provider against the preset threshold level set by the user at step 650. If the price of the selected service provider exceeds the threshold level, the device will proceed to step 651 where it will hold in a timing loop for a limited amount of time while the price will be displayed prominently (as shown in FIG. 7) during this period. If the user presses a dedicated override key during step 651, the device will move to step 660. If the override key is not depressed during the holding period, the device will return to the standby sequence at step 641 prior to resampling the information loop. In this way, it is ensured that the user recognizes the higher cost of establishing communications than was previously set as a threshold level.

If either the price is below the threshold level or the user has depressed the override key, the device will proceed to step 660 and seek to acquire an open channel to establish communications with the selected service provider. If an open channel is unavailable, the device may proceed to step 661, where it will recall its second choice of a service provider (from the original time frame of the optimal service provider in the information loop) and perform the threshold evaluation at step 650. If an open channel is available the device will proceed to step 670 and carry on two-way communications according to the standard operating procedure of the selected service provider.

The advantage of the above process is that the user is constantly receiving updated price information and may override the preset parameters of the device at any time. The process also protects against the possibility that the user will inadvertently or unconsciously exceed certain threshold level and run up unexpectedly high charges.

FIG. 7 shows an example of the information that may be displayed by the mobile device during the selection process. The display screen will inform the user of the name of the service provider, the prices charged by the service provider, and information on other services available to the user. The top of the display screen may contain the current status of the unit, the time, and the date. At the bottom of the screen are two battery indicators, standby and talk, estimating the remaining time available on the particular installed battery and charge. Standby defines a "sleep" mode in which the mobile device may monitor the information channel and control channel, awaiting input. In addition, other services that may be available to the user may be displayed for selection. Such services may include accessing voice mail, e-mail, pages or faxes; these services may be available through the Central Processing Facility.

Figure 8:
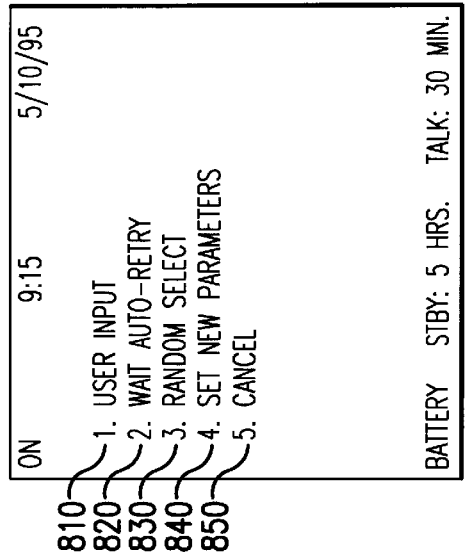

FIG. 8 shows an example of the options that may be made available to the user upon actuation of a "User Select" button. A user override is indicated in FIG. 6 at step 651, but a user-induced interrupt may occur at any time. Such an interrupt may be caused by the user pressing a dedicated button on the device. As in FIG. 7, device status, date, time, and battery power indicators are displayed. Options may be selected by selecting the appropriate numerical key on the keypad.

Figure 9:
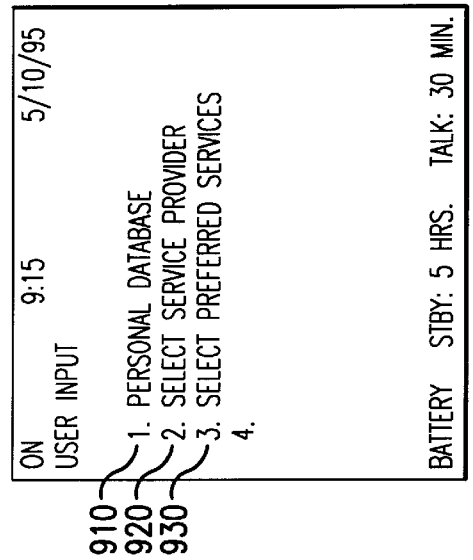

The first possible selection is a user input selection 810, which accesses more detailed and complex user input options (see FIG. 9). Selection of the second option "Wait Auto-Retry" 820 may be used when the user has dialed a number and has been unable to acquire either a service provider or an open channel, or has received a busy signal indicating the intended recipient is already engaged. Such conditions may automatically call up the menu in FIG. 8. Selection of Wait Auto-Retry 820 may instruct the device to store the intended number. In the event that the call has not been placed because the device could not acquire information on a service provider, the device will make the call immediately upon registration with a service provider. If the call could not be completed because of a busy condition or lack of open channels, the device may wait a certain amount of time and then retry the call. The user may be notified with a beep or message on the display when the call has been placed.

The Random Select option 830 may be chosen when the device has been unable to obtain an information channel. Option 830 instructs the device to select a service provider at random. The device may then scan for control channels in a frequency range selected at random from amongst pre-programmed frequency settings carrying two-way communications. The device may then automatically register with the random service provider.

Random Select has several important advantages over the prior art. With random selection, there will be no built-in bias towards one type of service provider (in cellular systems, A or B frequency ranges) so service providers will not be able to "capture" consumers automatically and charge excessive rates. The service providers will not know whether their service has been selected at random or through the use of updated pricing information. Thus each consumer will need to be offered prices as if the consumer had access to the information channel. Thus, if the service providers are competitive, selection of the random select 830 option may have very limited price consequences, if at all.

Selection of the Set New Parameters option 840 will trigger another menu with a subset of possible options (FIG. 10) to change the parameters defining the basic functioning of the mobile device and software. Selection of the Cancel option 850 may be used by the user to cancel any current routine that the user has initiated.

FIG. 9 illustrates the options that may be available to the user upon selection of the User Input option 810. Under the standard status, time, and date information, the heading "User Input" is displayed to aid user orientation. Selection of Personal Database 910 allows the user to access personal information files stored in the device, such as address and telephone directories. Selection of Select Service Provider 920 may allow the user to view the different communications options available and override any automatic decisions made by the device's software. Where no information channel has been acquired, the user may select a frequency range to search. For example, if the device is capable of reaching both cellular and personal communications service frequencies, but cannot acquire the information channel for details on particular providers, the user may instruct the device to search for a control channel only in the cellular A range.

Figure 10:
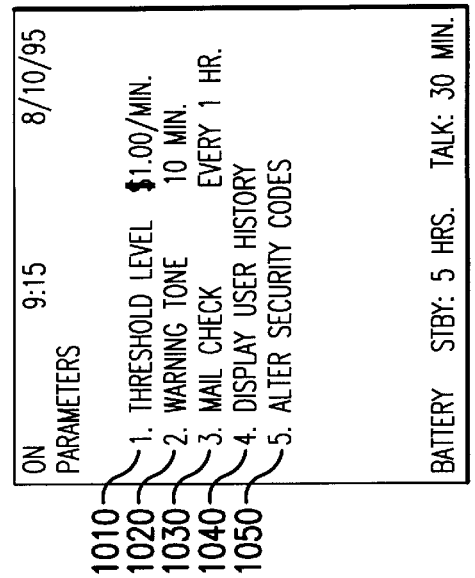
FIGS. 7–10 are views of display options of a mobile communication device according to one preferred embodiment of the present invention.

FIG. 10 shows a subroutine and menu that allows the user to set the basic operating parameters of the device. In addition to listing the available options, the display may also include the current settings for each option. The user may use the option Threshold Level 1010 to establish an upper limit on the rate that the device will automatically accept without an active user override. The user will indicate the price at which the user will want to manually override to engage two-way communications. Thus the user will be protected against high absolute rates, even if such rates are "optimal" according to the information loop on the information channel.

The Warning Tone option 1020 may help the user limit the amount of time spent making calls. The device may measure the duration of a call, and when the user has reached the preset limit, the device may issue a gentle audible warning tone (similar to a "call waiting" tone) heard only by the user of the device.

The Mail Check option 1030 allows the user to automatically check for voice mail or e-mail messages stored in the CPF 10. For example, the device may check the CPF 10 every hour. If there is a message, the user will be notified by ringing. If there are no messages, the device will remain silent.

The Display User History option 1040 allows the user to view the accumulated data on his or her usage patterns. Based on this specific information, the user may choose to alter his communications habits in certain regions or at certain times. In the prior art, the user may only have performed such an analysis using his or her billing statement. This task may have been quite difficult, complicated, time-consuming, and inaccurate. By offering the user an immediate, accurate, and clear display of his or her usage patterns, the present invention may allow the user to further lower communications charges by altering communications usage patterns. The Alter Security Codes option 1050 allows the user to alter security codes to improve the security of the device and its programming.

Figure 11:
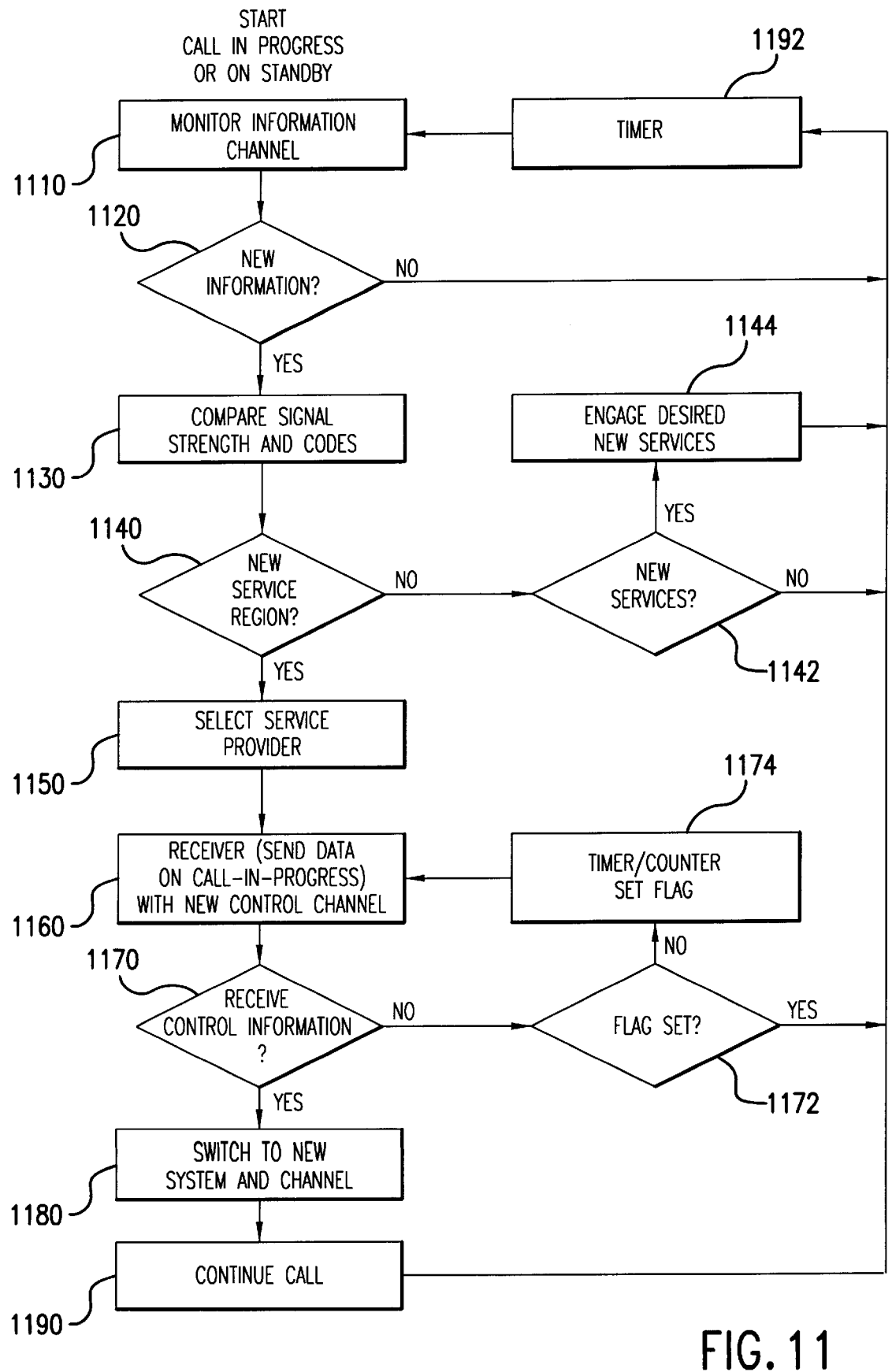
FIG. 11 is a flowchart of the operation of a mobile communications device while on standby or during an ongoing communication transmission according to one embodiment of the present invention.

FIG. 11 is a flowchart of a procedure for monitoring an information channel while the device is in standby mode and, in more advanced embodiments of the communications device, also while a call or communication is in progress. In standby mode the device continues to monitor its selected service provider and the information channel for changes. Time division techniques in more advanced embodiments may allow the information channel to be monitored even while a call is in progress.

The device may periodically monitor the information channel frequency at step 1110. The monitoring procedure may require the device to sample the information channel for data, as in indicated by the description of FIG. 6. Periodic checks insure that the device receives changing information as the user moves through a particular region. Timing routine 1192 will trigger a periodic check of the information channel. As a mobile device moves towards the center of a cellular region, it may receive more information on the wireless service providers in one information loop. As it moves outward, towards border regions, the device may receive less information on the current system, but more information will become available on the neighboring regions. Periodic updates also may allow the user to take immediate advantage of price changes.

The analysis of the data sampled in 1110 may reveal that there is a new set of codes indicating additional services from the same service provider (moving into the center of a coverage region) or that the device may be nearing a region with new service providers (as the user moves towards the fringes of a coverage region). If no new information has been received as determined at step 1120 the device advances to step 1192 to reset the timer.

If new information has been detected the process advances to step 1130, where the signal strength and codes of the information are analyzed and compared. When the new information does not indicate a potentially new service region, processing proceeds to step 1142. The device will then decide whether or not the new information contains any new service codes of interest. If not, the device will reset the timer.

If step 1140 indicates that the new information is from a new service region, then at step 1150 the device may select a new service provider from the available options. At step 1160, the device may attempt to register with this new service provider over its control channel. Step 1170 monitors receipt of a registration confirmation. If none is received the device will continue with its current selection (and any ongoing communication). This event may occur if the device is in an overlap region, in which it has received new information but has not yet reached the new coverage area. In this event the device may store the information in memory and retry the control channel at a later time.

Step 1172 identifies when a flag indicates the device should no longer attempt to contact the new control channel. The device may then proceed to step 1192 to reset the timer. If step 1172 does not detect a flag set, the device proceeds to step 1174, where there may be a timer or counter so that the device may retry the control channel for a predetermined time or number of attempts. Once the number of attempts or amount of time has been reached, step 1174 will set the flag such that if confirmation is not received on the current attempt the process will reset the timer at step 1192.

If confirmation is detected at step 1170, the device will switch to the new service provider. The data on the new service provider will replace that of the old service provider in memory. If a call is in progress, the device will have obtained a channel allocation for the call when it received confirmation and control instructions. The device may immediately tune to this channel and continue the current communication. Meanwhile, the service provider and CPF 10 will have already exchanged information and transferred the current communication of the device from the previous service provider to the new one.

This procedure represents a significant advantage in that it may allow a smooth handoff between service providers covering different regions. Those skilled in the art may also recognize that in digital embodiments of the mobile communications devices, when the communication is routed through the CPF 10, these procedures may allow a device to switch service providers in mid-communication without being noticed by the parties.

The roaming handoff procedure of FIG. 11 may be facilitated where neighboring service providers also utilize a time-synchronized overlap system similar to the one used by the present invention for the information channel. If neighboring service providers using the same channels or frequency ranges synchronize transmissions so that they utilize separate time or code sequences in an overlap region, a smooth handoff procedure between different providers may be completed. The overlap region may allow more time for neighboring systems to transfer information and calls before the signal of the initial system fades and the call is terminated. These overlap regions need not be very large to be effective, as shown in FIG. 2.

Figure 12:
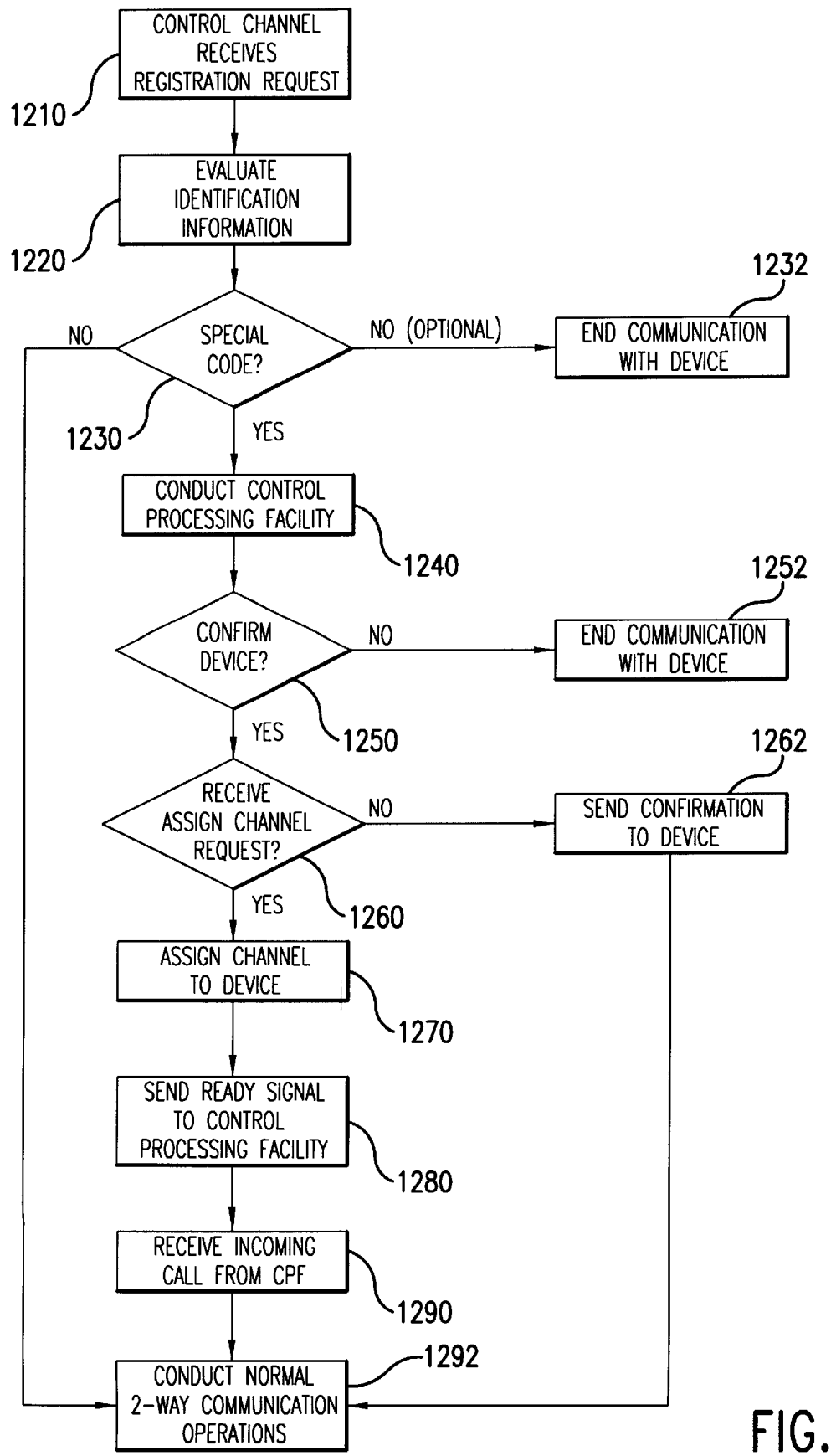
FIG. 12 is a flowchart of the operation of a service provider after receiving a registration request for a mobile communication device according to one embodiment of the present invention.

FIG. 12 is a flowchart for registering a mobile communication device of the present invention with a service provider. A mobile device may contact a service provider through a control channel by sending its identification number and other information. At step 1210 the service provider receives the registration request signal, which is also sent to a network central control facility for evaluation and storage; this practice is common in the art for billing purposes.

After the information has been formatted and analyzed at step 1220, step 1230 identifies whether or not the prospective registering device has a special identification number that indicates it to be a "client" of the information channel service of the present invention. If the CPF 10 (FIG. 1) does not confirm the "good standing" of the device, the service provider may handle the call as it would have normally with prior art devices at its own risk (Step 1292). Normally, the lack of confirmation would result in a denial of service (Step 1232).

At step 1230, if the service provider network control facility (18 in FIG. 1) recognizes the special identification number of the device, it will automatically establish communication with the CPF 10 (FIG. 1). At step 1240 the service provider will send, via either microwave transmission, land wire, or the PSTN, its own identification number and the identification number of the device requesting service to the CPF 10 for confirmation or further instructions.

If the device has offered a fraudulent identification number, the CPF 10 may send a denial signal which is detected at step 1250, and the service provider may terminate communication at step 1252. If the CPF 10 supplies confirmation it may also request that a channel be allocated immediately. If no Channel Allocation Request is detected at step 1260, the service provider will simply send confirmation to the device at step 1262 and then treat the device as it would any other communication device according to conventional procedures, at step 1292.

If the service provider receives a Channel Allocation Request from the CPF at step 1260, in Step 1270 the provider will find an open channel in the device's area and send the channel information to the device via the control channel. The service provider will then send a Ready signal to the CPF 10 (Step 1280). At step 1290, the service provider will receive the incoming communication from the CPF 10 and allocate it to the open channel assigned to the mobile device. Once the call has been allocated, the service provider may then treat the device as it would any other device as in the prior art (step 1292).

The above transfer procedure may be used to hand-off a call in progress from one service provider to another. As mentioned above, an advantage of the present invention is that the two service providers involved in the hand-off need not have pre-arranged agreements and protocols for the hand-off procedure.

Figure 13:
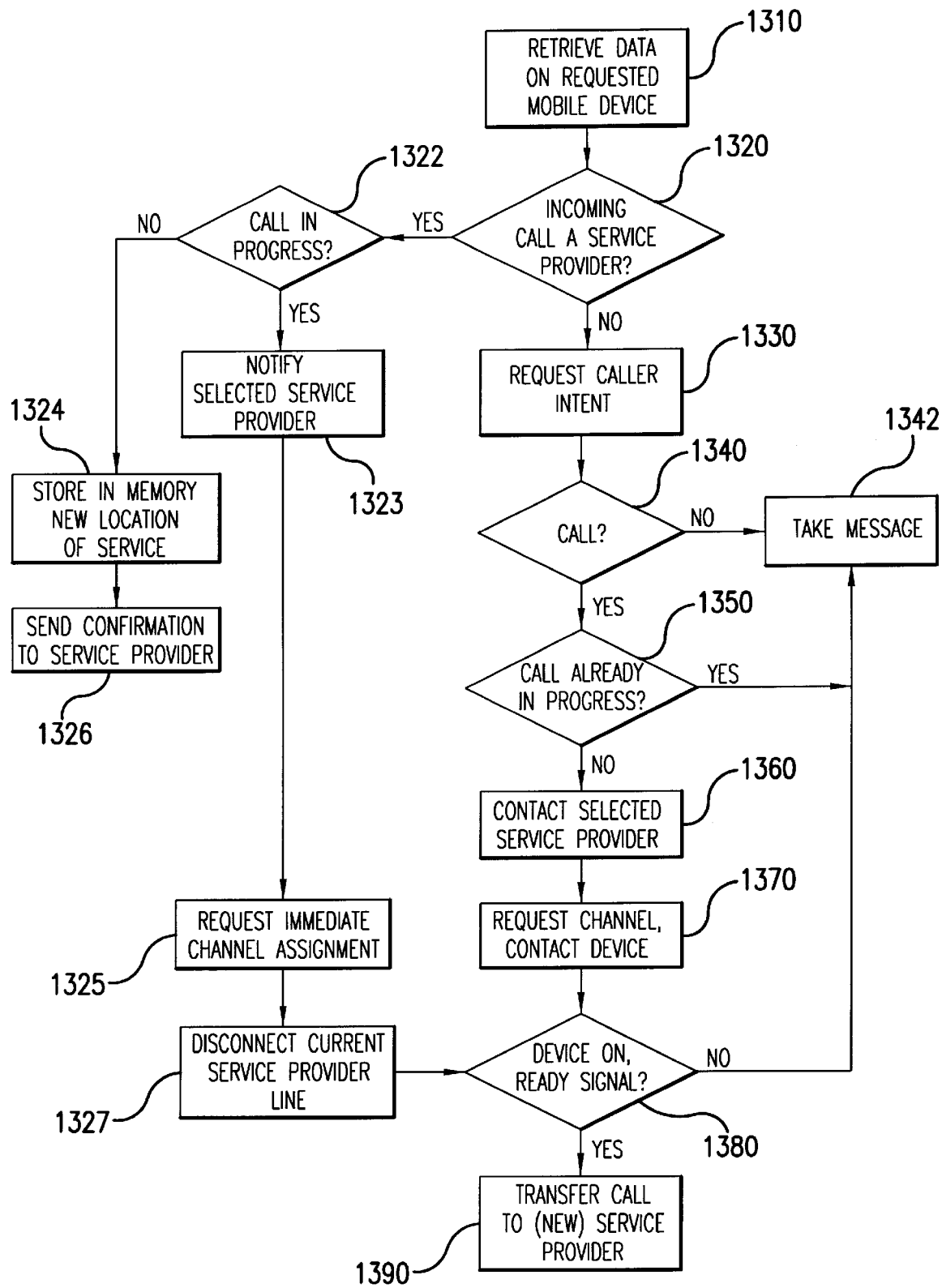
FIG. 13 is a flowchart of the operation of a central processing facility according to one embodiment of the present invention.

FIG. 13 is a flowchart for the operation of the CPF 10 according to one preferred embodiment of the invention. At step 1310, the CPF 10 has just received an incoming communication via either land wire, PSTN, or microwave transmission requesting information on, or a connection to, a particular mobile communication device. The immediate priority of the CPF 10 at step 1310 is to retrieve the information on the particular mobile communication device so that it may be analyzed.

At step 1320, the CPF 10 will ascertain whether or not the incoming communication is from a service provider or from a caller who wishes to establish communication with the mobile device. If 1320 identifies the caller as a service provider, the CPF 10 will then analyze its information to check whether or not the device has a call currently in progress. If there is no call-in-progress, the CPF 10 stores the new location of the particular device in memory (Step 1324) and send confirmation of the device's status to the service provider at step 1326. The new location of the mobile device may be identified simply by recording at a memory location associated with the mobile device, the identifying number of the service provider that requested the information on the device (based on the fact that the service provider will send to the CPF 10 only identification numbers of mobile devices which have contacted that service provider).

If Step 1322 did identify a call-in-progress, the CPF 10 will notify the service provider. The CPF 10 will then request that the service provider immediately allocate a channel (step 1325). The CPF 10 then will disconnect the current service provider carrying the two-way communication to the mobile device (step 1327). The transfer process of moving a current communication from one service provider to another is then completed in Step 1390 after receiving a Ready signal from the new service provider at step 1380.

Returning to Step 1320, if a service provider is not the originator of the incoming communication, the call is assumed to be from a caller that desires to establish two-way communications with the user of the mobile device. In this case the CPF 10 answers the call with an automatic DTMF voice response system or with an operator, at step 1330. If the caller does not wish to accept the charges of contacting the mobile communications device, the CPF may decline to complete the call and a voice mail message may be recorded in step 1342. The CPF 10 may then hold the message until it is requested by the user (see FIG. 10, step 1030) or the CPF 10 may contact the mobile user either through a call at some predetermined time interval or through a page (neither option shown). However, it is not necessary to insert a subroutine in step 1330 that requires a caller to pay for communication with the mobile device; the mobile device may be assessed the charges as is common in the prior art.

If the caller proceeds (accepts the charges), the CPF 10 will then check to see if the user is already engaged in a call, at step 1350. If so, the caller will be routed to step 1342 where the CPF will take a message. If no call is in progress, the CPF 10 will contact the selected service provider (step 1360) and request allocation of a channel (step 1370). If no Ready signal is received in Step 1380 (all channels may be busy or the device may be turned off), the caller will be routed to step 1342 to leave a message. After a Ready signal at step 1380, the call may be transferred to the service provider and communications will proceed as is common in the prior art (1390).

The invention having been thus described, it will apparent to those skilled in the art that the same may be varied in many ways without departing from the spirit and scope of the invention. Any and all such modifications are intended to be included within the scope of the following claims.

What is claimed is:

1. A system for providing selectable wireless communication service to users of mobile communication devices, comprising:

a central processing facility for collecting and processing cost and service feature information for a plurality of available wireless service providers in particular geographical regions; and means for transmitting the wireless service provider information processed by said central processing facility to mobile communication devices;

wherein users of said mobile communication devices are able to select a wireless communication service provider from among said at least two available service providers based on information received from said information transmitting means.

2. A system as set forth in claim 1, wherein said information transmitting means comprises at least one broadcast transmitter for broadcasting said service provider information to said mobile communication devices on a predetermined information channel.

3. A system as set forth in claim 1, wherein said central processing facility further includes means for accepting and storing messages which can be retrieved by said users of said mobile communication devices.

4. A system as set forth in claim 1, wherein said central processing facility further includes means for providing billing services to said wireless communication service providers.

5. A system as set forth in claim 2, wherein said information broadcast on said information channel includes identification of available service providers and pricing information for services provided by said providers.

6. A system as set forth in claim 1, wherein said information transmitted by said means for transmitting includes communication protocol standards used by said service providers.

7. A system as set forth in claim 1, further comprising a plurality of mobile communication devices having means for selecting specific wireless communication service providers.

8. A system as set forth in claim 2, further comprising a plurality of mobile communication devices having means for receiving information broadcast over said information channel and means for selecting control channels of specific wireless communication service providers based on said received information.

9. A system as set forth in claim 8, wherein said mobile communication devices further comprise means for displaying said received information and means for enabling a user to manually select a wireless communication service provider based on said displayed information.

10. A system as set forth in claim 8, wherein said mobile communication devices further comprise means for inputting user-defined service provider parameters and means for storing said user-defined parameters, said selecting means including means for comparing stored user-defined parameters with said received information and means for automatically selecting an available service provider.

11. A method for providing selectable wireless communication service to users of mobile communication devices, comprising the steps of:

collecting and processing cost and service feature information on at least two available wireless communication service providers in particular geographical regions; and transmitting the processed wireless service provider information to mobile communication devices;

wherein users of said mobile communication devices are able to select a wireless communication service provider from among said at least two available service providers based on information received from said transmitting step.

12. A method as set forth in claim 11, wherein said transmitting step comprises the step of broadcasting said service provider information to said mobile communication devices on a predetermined information channel.

13. A method as set forth in claim 11, further comprising the steps of accepting and storing messages which can be retrieved by said users of said mobile communication devices.

14. A method as set forth in claim 11, further comprising the step of providing billing services to said wireless communication service providers in connection with said selectable wireless communication service.

15. A method as set forth in claim 12, wherein said information broadcast on said information channel includes identification of available service providers and pricing information for services provided by said providers.

16. A method as set forth in claim 11, wherein said transmitted information includes communication protocol standards used by said service providers.

17. A method as set forth in claim 11, further comprising the step of selecting specific wireless communication service providers through a mobile communication device.

18. A method as set forth in claim 12, further comprising the steps of receiving at a mobile communication device information broadcast over said information channel, and selecting control channels of specific wireless communication service providers based on said received information.

19. A method as set forth in claim 18, further comprising the steps of displaying said received information, and manually selecting a wireless communication service provider based on said displayed information.

20. A method for enabling a user of wireless communication services to switch among various available service providers, comprising the steps of:

transmitting to a user's mobile communication device real time cost and service feature information for a plurality of available service providers for a region in which said user is currently located, thereby allowing said user to select a service provider to provide communication services to said user based on said transmitted information;

transmitting user status and identification information on specific users to service providers in response to requests transmitted by said service providers;

determining if users identified in said requests are presently engaged in a two-way wireless communication;

instructing a requesting service provider to allocate a communication channel for a specific user determined to be presently engaged in a two-way wireless communication; and transferring said two-way wireless communication to said requesting service provider and disconnecting said two-way wireless communication from a previous service provider in response to a ready signal received from said requesting service provider.

* * * * *